No. 719,116. PATENTED JAN. 27, 1903.
H. F. W. HUEG.
DOUGH DIVIDING AND SHAPING MACHINE.
APPLICATION FILED MAY 31, 1902.
NO MODEL. 3 SHEETS—SHEET 1.
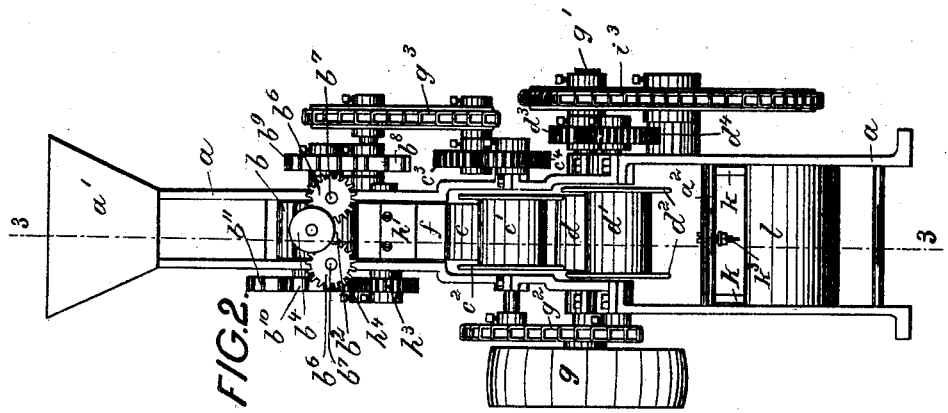
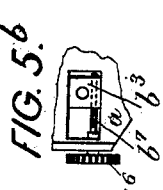
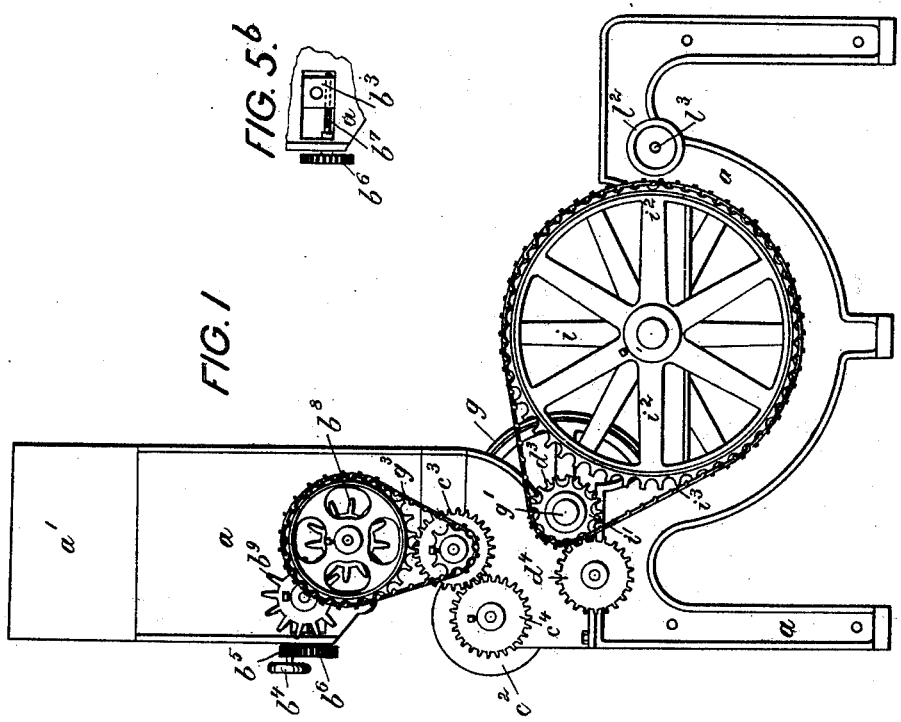
Witnesses:
Arthur Zeuner
William Schulz
Inventor:
Herman F. W. Hueg
by his attorneys
Roeder & Briesen

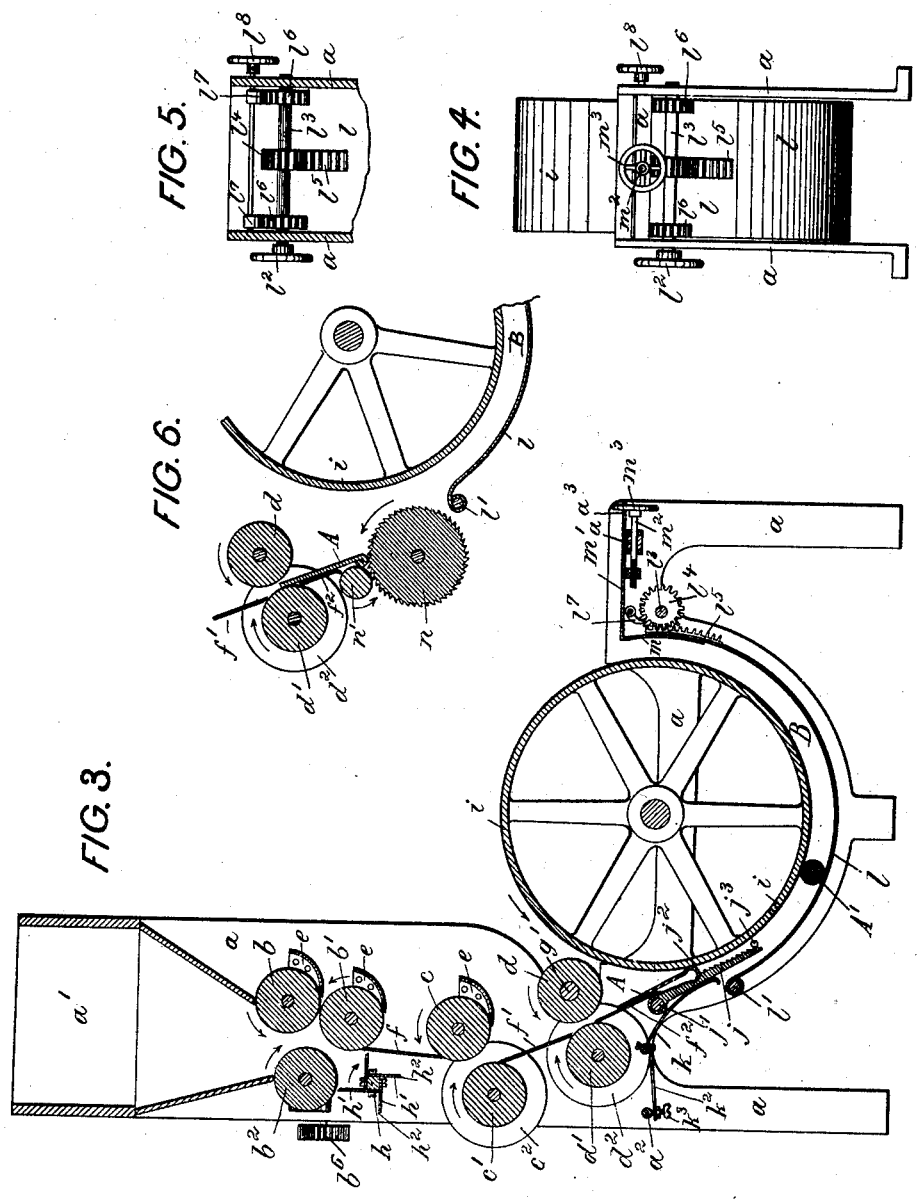

No. 719,116. PATENTED JAN. 27, 1903.
H. F. W. HUEG.
DOUGH DIVIDING AND SHAPING MACHINE.
APPLICATION FILED MAY 31, 1902.
NO MODEL. 3 SHEETS—SHEET 3.
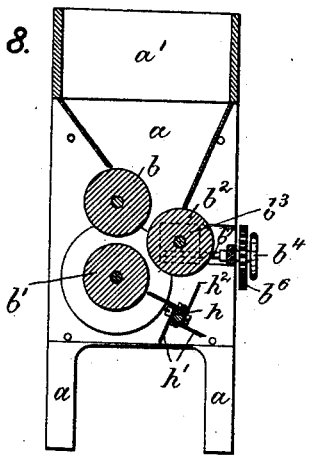
FIG. 8.
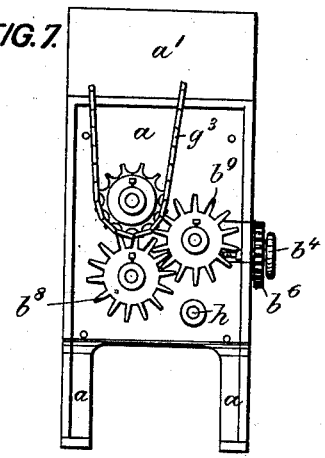
FIG. 7.
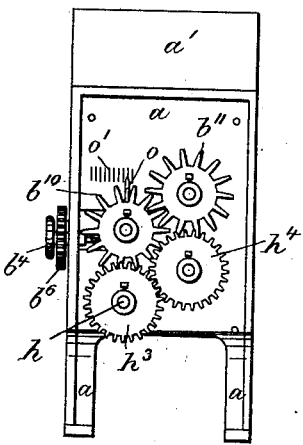
FIG. 9.
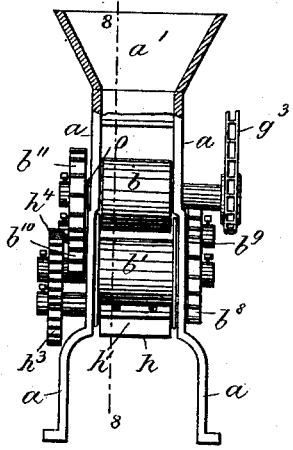
FIG. 10.
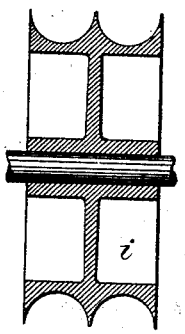
FIG. 11.
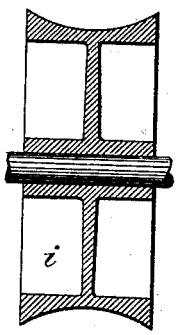
FIG. 12.
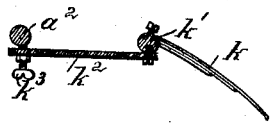
FIG. 5.ᵃ
Witnesses:
Arthur Guerg.
William Schulz.
Inventor:
Herman F. W. Hueg
by his attorneys
Roeder & Briesen

UNITED STATES PATENT OFFICE.

HERMAN F. W. HUEG, OF NEW YORK, N. Y.

DOUGH DIVIDING AND SHAPING MACHINE.

SPECIFICATION forming part of Letters Patent No. 719,116, dated January 27, 1903.

Application filed May 31, 1902. Serial No. 109,641. (No model.)

*To all whom it may concern:*

Be it known that I, HERMAN F. W. HUEG, a citizen of the United States, and a resident of New York city, borough of Queens, State of New York, have invented certain new and useful Improvements in Dough Dividing and Shaping Machines, of which the following is a specification.

This invention relates to a machine that receives the raised dough, rolls it out, divides it up into the bulk desired, and molds it to the required form.

In the accompanying drawings, Figure 1 is a side elevation of my improved machine; Fig. 2, a front elevation thereof; Fig. 3, a vertical section on line 3 3, Fig. 2; Fig. 4 a rear view of the lower part of Fig. 3; Fig. 5, a detail of the gearing for adjusting the apron; Fig. $5^a$, a detail of the spring setting mechanism; Fig. $5^b$, a detail of the adjustable bearing for the feed-roller. Fig. 6 illustrates a modification of the stop-plate. Fig. 7 is a right-hand side view showing the dough rolling and cutting mechanism detached; Fig. 8, a section on line 8 8, Fig. 10; Fig. 9, a left-hand side view, and Fig. 10 a front view thereof, partly in section; and Figs. 11 and 12 show different forms of the dough-molding drum.

The letter $a$ represents the frame of the machine, and $a'$ is the hopper, into which the dough, to be first rolled and divided and to be then molded, is introduced. In order to gradually sheet the dough discharged from the hopper and to draw the same through the machine, there are hung in the frame $a$, below the hopper $a'$, a suitable number of drawing or feed rollers $b\ b'\ b^2$, $c\ c'$, and $d\ d'$. The rollers $b\ b'$ are opposed by the roller $b^2$, which is mounted in adjustable bearings $b^3$, so that the thickness of the dough may be regulated. The bearings $b^3$ are adjustable by means of hand-wheel $b^4$, having pinion $b^5$, that intergears with pinions $b^6$ of the screw-shafts $b^7$, engaging the bearings $b^3$, Fig. $5^b$. The rollers $c\ c'$ and $d\ d'$ are respectively opposed to one another and are designed to gradually compress the dough A and deliver it to the molding mechanism, hereinafter described, in a flattened form, as shown in Fig. 3. To prevent an undue lateral spreading of the dough, the rollers $c'\ d'$ are flanged at their ends, as at $c^2\ d^2$. These flanges are sunk into the frame, which is spread laterally to accommodate the same. Some of the rollers are hung in pockets $e$, having bottoms, the lower edges of which are arranged tangentially to the rollers to constitute scrapers. These pockets are filled with flour for dusting the rollers. From the first set of rollers $b\ b'\ b^2$ the dough is guided to the rollers $c\ c'$ by a plate $f$, while a second plate $f'$ guides the dough from the rollers $c\ c'$ to the rollers $d\ d'$. The feed-rollers are driven from a power-pulley $g$, mounted upon the shaft $g'$ of roller $d$. This shaft is integeared with the shaft of roller $d'$ by wheels $d^3\ d^4$. Shaft $g'$ transmits motion to the shaft of roller $c'$ by chain $g^2$, said shaft imparting motion to the shaft of roller $c$ by wheels $c^4\ c^3$. The roller $b'$ is driven from the shaft of roller $c'$ by the chain $g^3$ and in turn transmits motion to the adjustable roller $b^2$ by long-toothed gear-wheels $b^8\ b^9$, that permit the adjustment of bearings $b^3$ without coming out of gear. The roller $b^2$ transmits motion to roller $b$ by long-toothed gear-wheels $b^{10}\ b^{11}$. Between the first and second pair of rollers is arranged an adjustable rotary cutter, that divides the dough into the lengths desired. This cutter is composed of an angular shaft $h$, hung parallel to the rollers and having flattened faces, from which the cutting-blades $h'$ project laterally. The cutting edge $h^2$ of each blade $h'$ is formed parallel to the axes of the feed-rollers and of the shaft $h$ and engages the dough sidewise—*i. e.*, at about right angles to its plane of feed. The drawings show a four-sided shaft having for cutters, so as to cut off four pieces during each rotation. By removing some of these cutters the length of the severed pieces may be readily changed. The shaft $h$ receives its motion from the shaft of roller $b'$ by gear-wheels $h^3\ h^4$, the ratio between which determines the speed of rotation of the cutters. By changing this ratio through the substitution of another set of gear-wheels the rotation of the cutter may be accelerated or retarded in order to sever smaller or larger pieces of dough. The cut off and flattened dough is delivered from the last pair of rollers $d$ $d'$ by a guide-plate $f^2$ to the mechanism for molding it into the form desired for baking purposes. These means consist, essentially, of a rotating drum $i$, driven from shaft $g'$ by chain-wheels $i'$ $i^2$ and chain $i^3$. In proximity to this drum is hung upon a pintle $j'$ a catch or stop plate $j$, which is composed of a tapering upper section and a roughened lower section that projects beyond the upper section to form an offset or shoulder $j^2$. A pair of leaf-springs $k$ hold the lower end of the plate $j$ against a stop $j^3$ at the desired distance from the drum $i$. These springs $k$, Fig. 5$^a$, are secured to a shaft $k'$, which may be rocked by means of a lever $k^2$ and a set-screw $k^3$, carrying a jam-nut and impinging against fixed rod $a^2$, so as to adjust the tension of the springs. The lower portion of the drum $i$ is surrounded by a curved apron $l$, hung at one end upon pintle $l'$, while its other or free end is provided with means for setting it closer to or farther away from the periphery of the drum $i$, so as to change the height of the passage B between the drum and apron. This passage is closed at both sides by the frame or by suitable flanges. The drum $i$, as well as the apron $l$, is covered with canvas. The means for raising and lowering the apron are shown to consist of a hand-wheel $l^2$, fast upon shaft $l^3$, carrying an eccentric toothed wheel $l^4$, which engages a rack $l^5$, formed upon the free end of the apron. Upon the shaft $l^3$ are mounted ratchet-wheels $l^6$, engaged by pawls $l^7$, that may be lifted by hand-wheel $l^8$. If the eccentric is thrown out of gear with the rack $l^5$, the apron will drop on hinge $l'$ and permit the machine to be cleaned. The free end of apron $l$ is overlapped by a curved flange $m$, formed on the inner end of the delivery-table $m'$, said table being movable in guides $a^3$ of frame $a$. A set-screw $m^2$, having hand-wheel $m^3$ and turning in frame $a$, is adapted to move the table along its guides, so as to change the distance between the flange $m$ and the periphery of drum $i$. The relative adjustment between apron $l$ and flange $m$ should be such that the flange will always lie flat upon the upper face of the apron and form, in effect, a continuation of the same, so as to conduct the dough from the apron upon the table $m'$. The end of the piece of dough A, delivered by rollers $d$ $d'$ over guide-plate $f^2$, is caught or intercepted by the offset $j^2$ of stop-plate $j$, so that the dough will sag above the offset, Fig. 3. This sagging portion is caught by the rotating drum $i$, which gradually rolls the dough up into a spiral A' as the dough is forced downward between the drum and the roughened lower section of plate $j$. During this operation the plate $j$ is pushed away from the drum against the action of springs $k$, so as to discharge the dough-cylinder A' into passage B. The further rotation of drum $i$ will feed the dough-cylinder A' along the passage B, so as to give it a true and smooth surface, until it is finally delivered upon the table $m'$ ready to be raised and baked. By changing the form of the working surface of the drum $i$ different configurations may be given to the bread. Thus in Fig. 4 is shown a plain cylindrical surface, while in Fig. 11 a double concave surface, and in Fig. 12 a single concave surface is illustrated. These configurations are obviously open to an indefinite number of variations.

In Fig. 6 is illustrated a modification of the catch-plate $j$, said plate being here shown to be replaced by a corrugated roller $n$, working in conjunction with a plain roller $n'$. The end of the dough is curved first sidewise by roller $n$ and thence upward by roller $n'$, so that the dough is gradually rolled up into a spiral shape by the rotation of the rollers. The relative position of the rollers is such that after the dough has been completely rolled up it will fall off the roller $n$ by gravity, to be thence taken along through passage B by drum $i$.

It is obvious that the mechanism for rolling and cutting the dough may be mounted in a different frame from that which carries the mechanism for molding it. In Figs. 7 to 10 the dough rolling and cutting mechanism is shown detached and supported by a separate frame. This mechanism is of the same construction as that shown in Figs. 1 to 3, motion being imparted to it by a chain $g^3$.

A pointer $o$, secured to the adjustable bearing $b^3$ and moving along a scale $o'$, serves to gage the quantity of dough delivered to the cutters.

What I claim is—

1. In a dough dividing and shaping machine, the combination of a frame having receding sections, with a feed-roller having a pair of flanges that are sunk into the frame within said sections, substantially as specified.

2. In a dough dividing and shaping machine, the combination of a pair of feed-rollers, with a pivoted spring-influenced catch, an intervening guide-plate, a drum, and an apron beneath the drum, substantially as specified.

3. In a dough dividing and shaping machine, a spring-influenced catch having a tapering upper section, a roughened lower section and an intervening offset, and adapted to intercept the dough, combined with a drum adapted to roll and mold the dough to its desired shape, substantially as specified.

4. In a dough dividing and shaping machine, the combination of a drum with a pivoted apron having a rack at its free end, and with an eccentric toothed wheel engaging said rack, substantially as specified.

5. In a dough dividing and shaping machine, the combination of a drum with an adjustable apron beneath the same, and with a delivery-table having a flange that overlaps said apron, substantially as specified.

6. In a dough dividing and shaping machine, the combination of a drum with a pivoted apron, means for adjusting the free end thereof, a delivery-table having a flange that overlaps the apron, and means for adjusting said table, substantially as specified.

Signed by me at New York city, New York, this 28th day of May, 1902.

HERMAN F. W. HUEG.

Witnesses:
   F. V. BRIESEN,
   EDUARD RAY.